(12) United States Patent
Lee

(10) Patent No.: US 12,156,620 B2
(45) Date of Patent: Dec. 3, 2024

(54) AUTONOMOUS MOVING DEVICE AND DOCKING STATION

(71) Applicant: SAMSUNG ELECTRONICS CO., LTD., Suwon-si (KR)

(72) Inventor: Kyungwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 510 days.

(21) Appl. No.: 17/270,764

(22) PCT Filed: Aug. 23, 2019

(86) PCT No.: PCT/KR2019/010777
§ 371 (c)(1),
(2) Date: Feb. 23, 2021

(87) PCT Pub. No.: WO2020/040603
PCT Pub. Date: Feb. 27, 2020

(65) Prior Publication Data
US 2021/0330165 A1    Oct. 28, 2021

(30) Foreign Application Priority Data
Aug. 23, 2018  (KR) .................. 10-2018-0098807

(51) Int. Cl.
*A47L 11/40*  (2006.01)
*G05D 1/00*  (2024.01)
*H02J 50/10*  (2016.01)

(52) U.S. Cl.
CPC ........ *A47L 11/4011* (2013.01); *G05D 1/0225* (2013.01); *H02J 50/10* (2016.02);
(Continued)

(58) Field of Classification Search
CPC ............. A47L 9/2873; A47L 2201/022; A47L 2201/028; A47L 2201/04; A47L 9/2884; A47L 2201/024
See application file for complete search history.

(56) References Cited

U.S. PATENT DOCUMENTS

| 2004/0088814 | A1 | 5/2004 | Hsieh |
| 2006/0090287 | A1* | 5/2006 | Genoa .................. A47L 9/00 15/325 |

(Continued)

FOREIGN PATENT DOCUMENTS

| JP | 2003-310492 | 11/2003 |
| JP | 2013-141341 | 7/2013 |

(Continued)

OTHER PUBLICATIONS

International Search Report for PCT/KR2019/010777 dated Dec. 2, 2019, 5 pages.
(Continued)

*Primary Examiner* — Eric J Rosen
*Assistant Examiner* — Sharonda T Felton
(74) *Attorney, Agent, or Firm* — Nixon & Vanderhye, P.C.

(57) ABSTRACT

An example autonomous moving device includes a housing in which at least one moving part and a first actuator for providing power to the moving part are accommodated; a first charger which is disposed to be adjacent to at least a portion of the surface of the housing and which is for the wireless charging of electric power used by the device; a second actuator for causing air to flow; a first opening, formed at one side of the housing, for discharging the air toward the first charger in order to remove foreign material from the first charger or around the first charger; and a first duct connected to the first opening from the second actuator.

12 Claims, 13 Drawing Sheets

(52) U.S. Cl.
CPC ... *A47L 2201/022* (2013.01); *A47L 2201/028* (2013.01); *A47L 2201/04* (2013.01)

(56) References Cited

U.S. PATENT DOCUMENTS

| | | | |
|---|---|---|---|
| 2007/0226949 A1* | 10/2007 | Hahm | A47L 9/009 15/340.1 |
| 2012/0102670 A1 | 5/2012 | Jang et al. | |
| 2014/0222271 A1 | 8/2014 | Merten et al. | |
| 2018/0014709 A1* | 1/2018 | O'Brien | G05D 1/0225 |

FOREIGN PATENT DOCUMENTS

| | | | |
|---|---|---|---|
| JP | 2014-94233 | | 5/2014 |
| JP | 2014094233 A | * | 5/2014 |
| KR | 10-0657737 | | 12/2006 |
| KR | 10-2007-0101432 | | 10/2007 |
| WO | 2016-206732 | | 12/2016 |

OTHER PUBLICATIONS

Written Opinion of the ISA for PCT/KR2019/010777 dated Dec. 2, 2019, 6 pages.
Office Action dated Jan. 5, 2023 in counterpart Korean Patent Application No. 10-2018-0098807 and English-language translation.
Extended Search Report dated Sep. 17, 2021 in EP Application No. 19851850.8.

* cited by examiner

AUTONOMOUS MOVING DEVICE AND DOCKING STATION

CROSS-REFERENCE TO RELATED APPLICATION(S)

This application is a National Phase Entry of PCT International Application No. PCT/KR2019/010777, which was filed on Aug. 23, 2019 and claims priority to Korean Patent Application No. 10-2018-0098807, which was filed on Aug. 23, 2018 in the Korean Intellectual Property Office, the contents of which are incorporated herein by reference.

BACKGROUND

1. Field

Various embodiments disclosed in this document relate to an automatic moving device having a wireless charging function and a wireless docking station.

2. Description of the Related Art

A robotic cleaner, which epitomizes an automatic moving device, refers to a device configured to automatically clean dust and the like off the floor while traveling an area to be cleaned without user manipulation. The robotic cleaner controls its driving device such that the same covers the entire area to be cleaned, and controls cleaning units such as a brush, dust suction tube, and the like such that dust and the like can be efficiently removed.

The robotic cleaner may be configured such that the same can be automatically controlled to exhibit a performance without the user's continuous management. According to an embodiment, if the robotic cleaner receives an insufficient level of power from its battery while cleaning a designated area, the same may automatically dock with its docking station, charge the battery, and then resume the cleaning work.

A magnetic induction scheme is commonly used, between the charging part provided in the robotic cleaner and the charging part provided in the docking station, when the robotic cleaner is charged while docking with the docking station. According to some embodiments, metallic foreign materials may get stuck between the two charging parts. If charging proceeds with such metallic foreign materials existing, the metallic charging parts may generate heat and thus damage the device.

Therefore, it may be necessary to consider such a situation in which metallic foreign materials may get stuck between the charging parts during a charging operation, thereby damaging the device. According to an embodiment, the efficiency value of a power transfer unit (PTU) and that of a power receiving unit (PRU) may be monitored, thereby suspending power transfer if metallic foreign materials exist between the charging parts.

According to another embodiment, a sensor may be used to detect foreign materials, if any, between the charging parts such that power transfer is suspended if it is determined that metallic foreign materials deemed to affect the charging operation exist between the charging parts.

SUMMARY

When the efficiency value of the PTU and that of the PRU are monitored, for example, according to the prior art, a low level of power loss (for example, a loss of 0.5 W) can be accurately detected during low-power (for example, 10 W) transfer, but various deviation-incurring elements (for example, if a charging part is a coil, the inductance deviation of the coil, alignment errors, sensor allowable errors, and the like) may make it difficult to detect a low level of power loss (for example, a loss of 0.5 W) during relatively high-power (for example, 100 W) transfer.

As another example, if a sensor is used to detect foreign materials between the charging parts according to the prior art, and if the charging parts occupy a large area, it is necessary to use a sensor capable of covering a large area to determine whether or not metallic foreign materials exist between the surfaces of the charging parts. This approach is practically impossible to implement in terms of feasibility, such as manufacturing costs.

Various embodiments disclosed in this document seek to provide embodiments for effectively removing foreign materials, as a scheme for directly solving the problem in that, when an automatic traveling device docks with a docking station, foreign materials may exist on charging parts for power transfer and thus generate heat.

Various embodiments disclosed in this document seek to provide embodiments for detecting foreign materials existing on an automatic moving device and on a docking station with minimum costs.

According to various embodiments disclosed in this document, there may be provided an automatic moving device including: a housing containing therein at least one moving part and a first actuator part configured to provide mechanical power to the moving part; a first charging part for wireless charging of electric power used by the device, the first charging part disposed adjacent to at least a part of the surface of the housing; a second actuator part for causing air to flow; a first opening formed in one side of the housing so as to discharge air toward the first charging part in order to remove foreign materials from the first charting part or from a peripheral part of the first charging part; and a first duct part connected from the second actuator part to the first opening.

According to various embodiments disclosed in this document, there may be provided a docking station including: a body part; a docking part provided on one side of the body part such that the automatic moving device docks therewith; a second charging part formed in a position facing a first charging part provided in the automatic moving device when the automatic moving device is docked; a third actuator part contained in the body part; a third opening for removing the foreign materials; and a third duct part connected from the third actuator part to the third opening, wherein air is discharged or suctioned through the third opening so as to remove foreign materials existing on the first charging part, on the second charging part, or between the first charging part and the second charging part.

According to various embodiments disclosed in this document, there may be provided a method for removing foreign materials when an automatic moving device docks with a docking station, the method including the operations of: causing the automatic moving device to enter the docking station; and removing foreign materials from a charging part of the automatic moving device or from a charging part of the docking station by using air discharged from the automatic moving device.

Various embodiments disclosed in this document are advantageous in that, unlike conventional approaches which consider power loss when metallic foreign materials exist between charging parts, the metallic foreign materials existing between the charging parts are removed, thereby solving the problem of the prior art fundamentally.

According to various embodiments disclosed in this document, foreign materials are detected by using the existing IR module used for communication between the power transfer unit (PTU) and the power receiving unit (PRU), without adding a separate sensor for detecting the foreign materials, such that foreign materials on the automatic moving device and on the docking station can be detected with minimum costs.

DETAILED DESCRIPTION

Hereinafter, various embodiments of the disclosure will be described with reference to the accompanying drawings.

Figure 1:
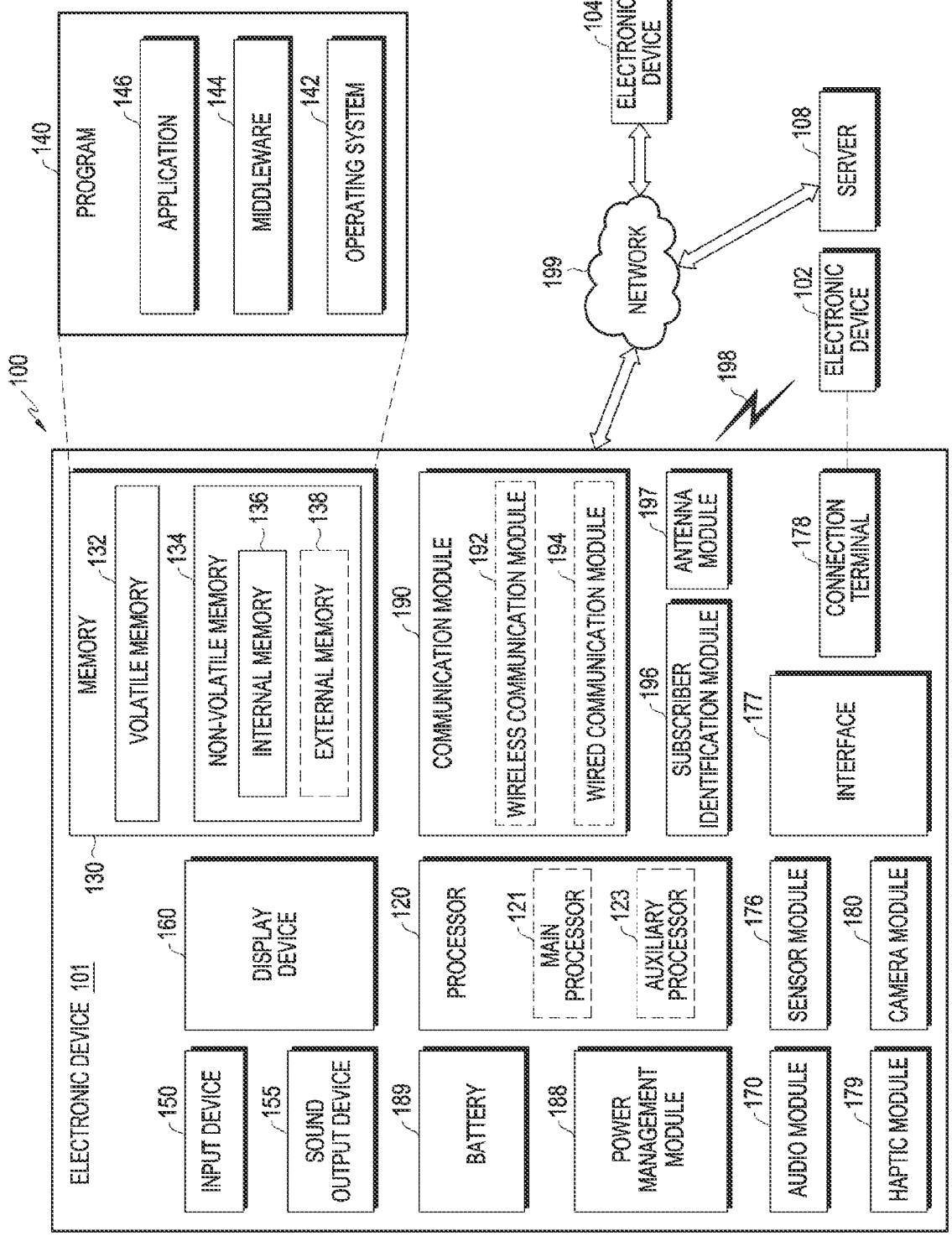
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An electronic device (for example, 101 in FIG. 1) according to various embodiments disclosed in this document may be an automatic moving device (for example, 200 in FIG. 2, described later) capable of automatically making movements, determinations, and/or operations (hereinafter, referred to as "device 200"). Obviously, the electronic device (for example, 101 in FIG. 1) in this document is not limited to a device configured to behave automatically only, but may include a device remotely controlled by the user so as to move. The electronic device (for example, 101 in FIG. 1) according to various embodiments disclosed in this document may include a device (for example, 200 in FIG. 2, described later) equipped with an AI such that the same is driven through learning (machine learning or deep learning).

The electronic device (for example, 101 in FIG. 1) according to various embodiments disclosed in this document may include a device (for example, 200 in FIG. 2, described later), such as a robot, to which various moving means are applied. As used herein, various moving means may encompass moving means such as traveling means, flying means, and the like. Any means for changing the position of the device 200 may be included in various moving means in this document.

The electronic device (for example, 101 in FIG. 1) according to various embodiments disclosed in this document may include not only the device (for example, 200 in FIG. 2, described later), but also a station (for example, 300 in FIG. 4, described later) with which the device 200 docks.

According to various embodiments disclosed in this document, examples of the device (for example, 200 in FIG. 2, described later) may include a wireless cleaning robot, an unmanned robot, an automatic traveling car, and an unmanned aerial vehicle (for example, a drone). In addition, any entity capable of automatically behaving and moving may be included in the electronic device (for example, 101 in FIG. 1) mentioned in this document.

It will be assumed in the following description with reference to the accompanying drawings that the automatic moving device (for example, 200 in FIG. 2, described later) (hereinafter, referred to as "device 200") is a wireless cleaning robot.

Figure 2:
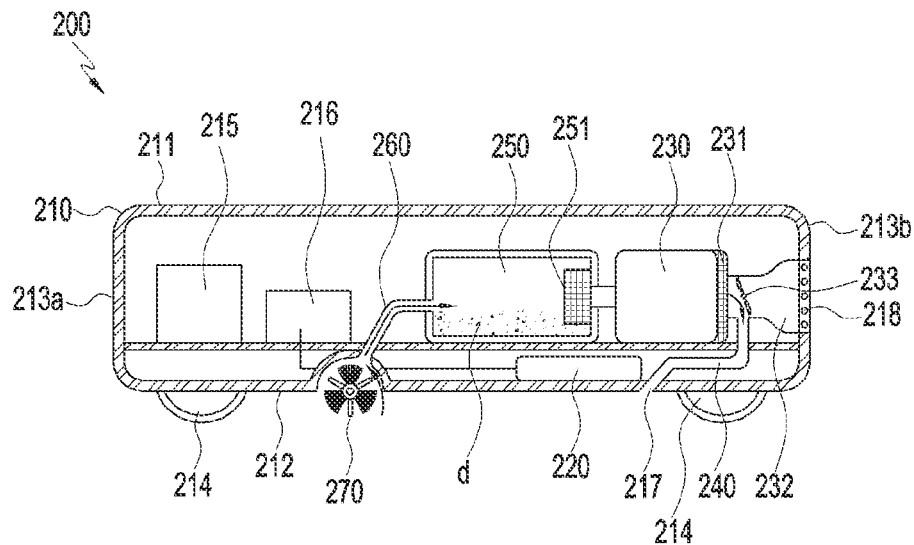
FIG. 2 is a sectional diagram schematically illustrating discharge of air through a first opening in connection with an automatic moving device according to various embodiments disclosed in this document.
Figure 3:
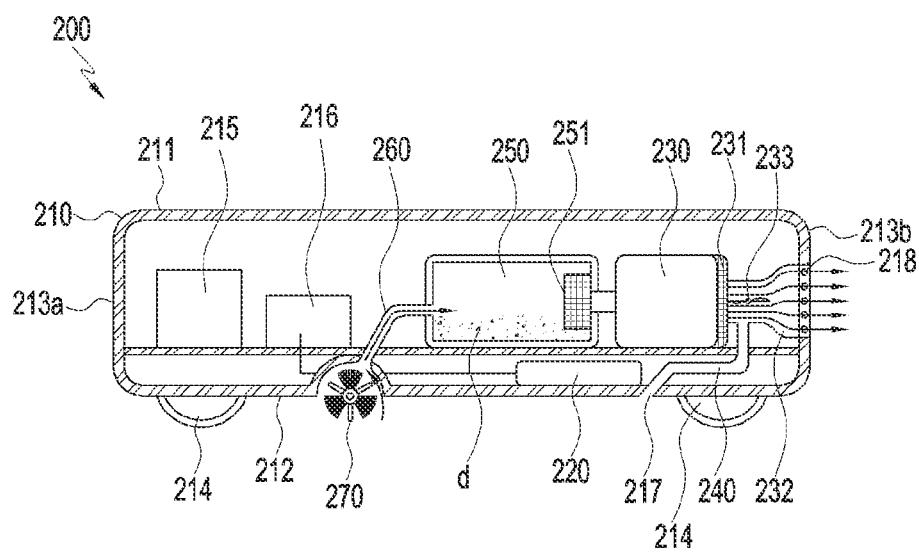
FIG. 3 is a sectional diagram schematically illustrating discharge of air through a second opening in connection with an automatic moving device according to various embodiments disclosed in this document.

FIG. 2 is a sectional diagram schematically illustrating discharge of air through a first opening 217 in connection with a device 200 according to various embodiments disclosed in this document. FIG. 3 is a sectional diagram schematically illustrating discharge of air through a second opening 218 in connection with a device 200 according to various embodiments disclosed in this document.

The device according to various embodiments disclosed in this document may include a housing 210 including a moving part 214 and a first actuator part 215, a first charging part 220, a second actuator part 230, and a first opening 217.

Referring to FIG. 2 and FIG. 3, the housing 210 may include an upper surface 211, a lower surface 212, and side surfaces 213a and 213b surrounding the space between the upper surface 211 and the lower surface 212. According to an embodiment, the housing 210 is shaped, as illustrated in the drawings, to have a large overall length, compared with the height thereof, and to have a rectangular section. However, the shape of the housing 210 is not limited thereto, and may be variously formed as long as the same can have an aesthetic appeal to the user.

The housing 210 may include at least one moving part 214. For example, according to an embodiment in which the device 200 is an automatic traveling device, the moving part 214 may include a wheel and/or a track. The housing 210 is illustrated in the drawings as including at least one wheel, and the device 200 may use the wheel so as to make free movements, including forward/backward/leftward/rightward movements and rotating movements.

The housing 210 may include at least one actuator part, as well as various electronic components. Examples of the various electronic components may include a processor 217 (for example, 120 in FIG. 1), a memory (for example, 130 in FIG. 1), a sound output device (for example, 155 in FIG. 1), a display device (for example, 160 in FIG. 1), an audio module (for example, 170 in FIG. 1), a sensor module (for example, 178 in FIG. 1), an interface (for example, 177 in FIG. 1), a camera module (for example, 180 in FIG. 1), a power management module (for example, 188 in FIG. 1), a battery (for example, 189 in FIG. 1), a communication module (for example, 190 in FIG. 1), and an antenna module (for example, 197 in FIG. 1), for example.

The actuator part and the processor 217 (for example, 120 in FIG. 1) may be described in this document as the epitomes of various electronic components included in the housing 210. According to an embodiment, the actuator part, which is a mechanical power-generating device contained in the body part, may be a motor capable of rotating in one direction (forward direction) or in the opposite direction (backward direction). According to an embodiment, two or more actuator parts may be provided inside the body part. One actuator part (for example, the first actuator part 215) may transfer mechanical power to the moving part 214 such that the electronic device moves, and another actuator part (for example, the second actuator part 230) may be configured such that air flows in one direction (or in the opposite direction) inside the housing 210.

According to various embodiments, electric power used by the device 200 may be electric power used to operate the actuator part and other various electronic components.

According to various embodiments, the first charging part 220 may be provided for wireless charging of electric power to be used by the device 200. The first charging part 220 may receive electric energy supplied from a second charging part (for example, 320 in FIG. 5, described later) provided in an external electronic device (for example, the docking station 300 in FIG. 5, described later) of the device 200. By receiving electric energy supplied from the second charging part 320 through the first charging part 220, the device 200 may operate the actuator part and various electronic components.

According to various embodiments, the first charging part 220 may be a power receiving unit (PRU), and the second charging part 320 may be a power transfer unit (PTU). According to an embodiment, the first charging part 220 may include a coil, and the second charging part 320 may include an inverter and a coil for AC power transfer. According to another embodiment, the first charging part 220 and the second charging part 320 may include IR communication modules for communication with each other, which is necessary during a charging operation.

Figure 4:
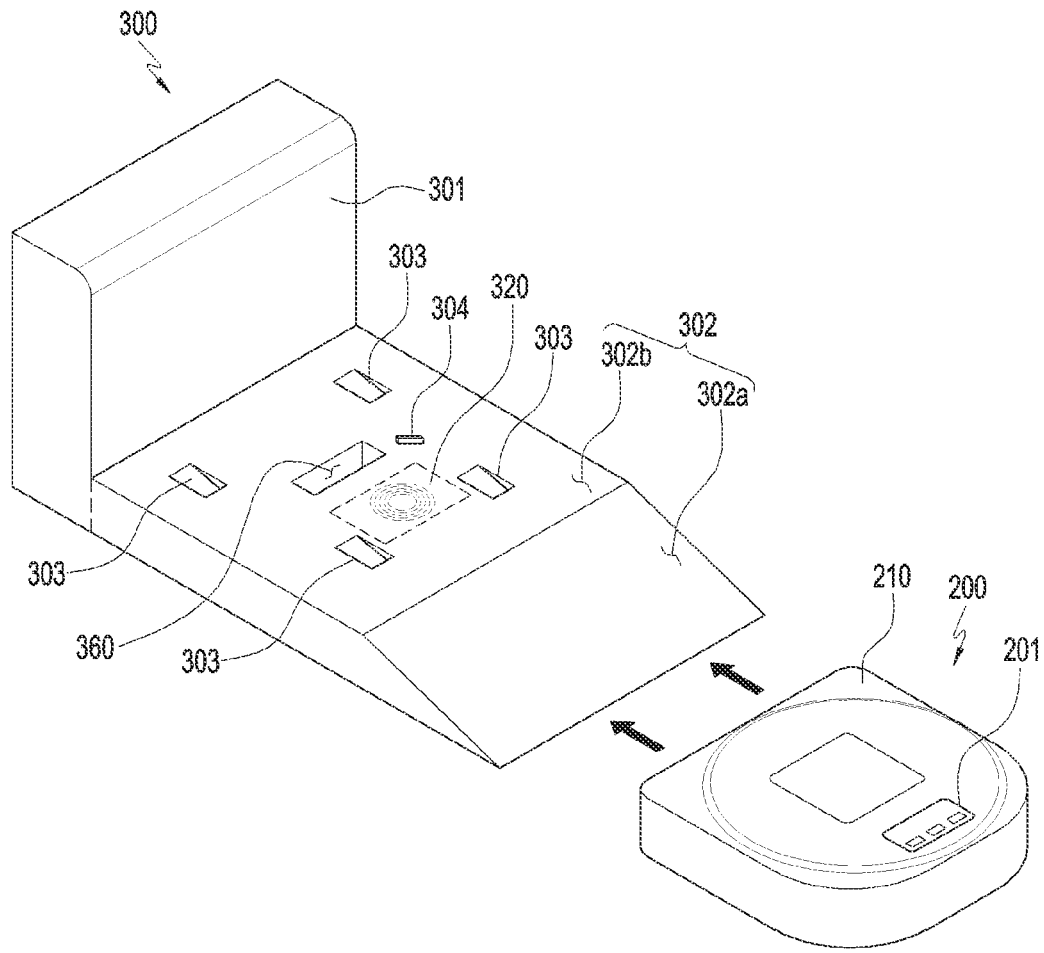
FIG. 4 is a perspective view illustrating an automatic moving device according to various embodiments disclosed in this document, which is entering a docking station.
Figure 5:
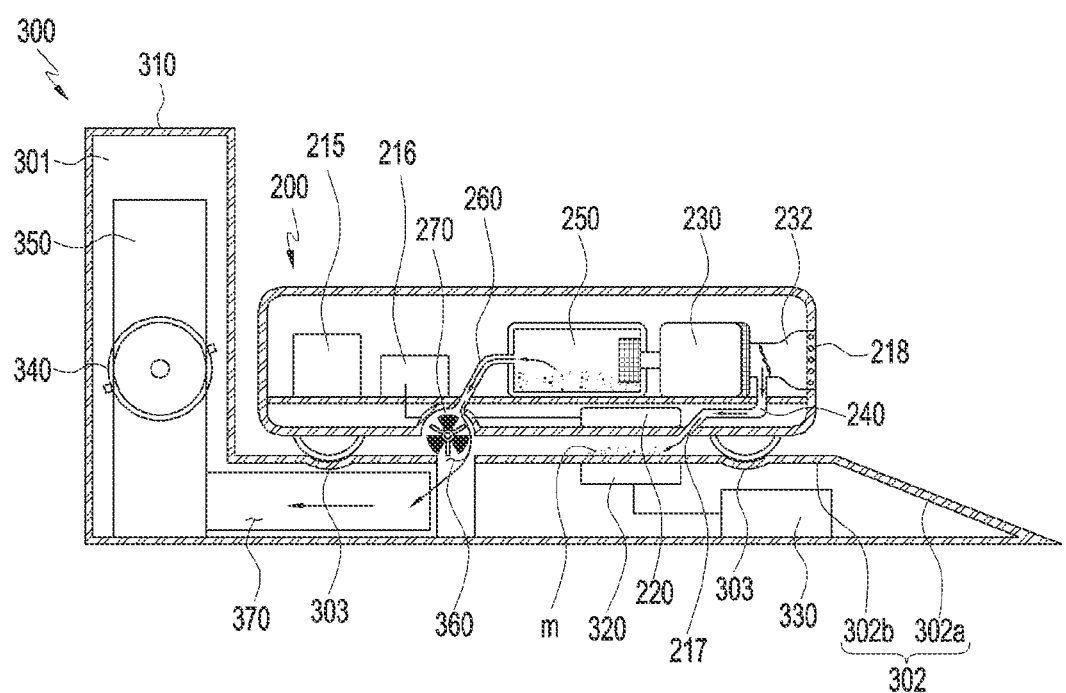
FIG. 5 is a sectional diagram schematically illustrating an automatic moving device according to various embodiments disclosed in this document, which is entering a docking station.

FIG. 4 is a perspective view illustrating a device 200 according to various embodiments disclosed in this document, which is entering a docking station 300. FIG. 5 is a sectional diagram schematically illustrating the device 200 according to various embodiments disclosed in this document, which has docked with the docking station 300.

According to an embodiment, if the device 220 has a designated level of power or less, the device 200 may automatically perform an operation of receiving electric energy (hereinafter, referred to as "charging operation") by using the first charging part 220 and the second charging part 320. If the device 200 has a designated level of power or less, the same may automatically perform an operation of receiving electric power by docking with the docking station 300. The charging operation, as used herein, may be performed by a processor (for example, 120 in FIG. 1) (for example, 216 in FIG. 2 or 330 in FIG. 5).

According to various embodiments, various types including a coil or a connecting terminal may be applied to the first charging part 220. In addition, a type corresponding to the first charging part 220 may be applied to the second charging part 320. For example, if the first charging part 220 is made of a receiving coil, the second charging part 320 may be made of a transmitting coil. If the first charging part 220 and the second charging part 320 are made of coils, a charging operation may be implemented even if the first charging part 220 and the second charging part 320 are spaced apart by a predetermined distance. According to another embodiment, if the first charging part 220 is a contact terminal, the second charging part 320 may also be made of a contact terminal. In this case, a charging operation may be implemented by contact between the first charging part 220 and the second charging part 320.

According to various embodiments, the first charging part 220 may be disposed adjacent to at least a partial surface of the housing 210.

According to the embodiment illustrated in FIG. 2 to FIG. 5, the first charging part 220 is illustrated as being formed adjacent to the lower surface 212 of the housing 210. According to an embodiment, the first charging part 220 may be disposed on the lower surface 212 of the housing 210 near the rear side surface 213*b*.

The position in which the first charging part 220 is disposed is not limited to any specific embodiment. For example, according to the embodiment illustrated in FIG. 9 to FIG. 12 (described later), the first charging part 420 may be formed adjacent to the upper surface 411 of the housing 410. According to an embodiment, the first charging part 420 may be disposed on the upper surface 411 of the housing 410 near the front side surface 413*a*.

In addition, the position of the first charging part 220 may be designated more variously. In connection with the embodiment illustrated in FIG. 2 to FIG. 5, the first charging part 220 may be disposed on the lower surface 212 of the housing 210 near the front side surface 213*a*, unlike the position illustrated in the drawings. In connection with the embodiment illustrated in FIG. 9 to FIG. 12, the first charging part 420 may be disposed on the upper surface 411 of the housing 410 near the rear side surface 413*b*, unlike the position illustrated in the drawings. According to another embodiment, the first charging part 220 or 420 may be formed on the front side surface 213*a* or 413*a* or rear side surface 213*b* or 413*b* of the housing 210 or 410.

According to various embodiments, the second charging part 320 may be formed in a position corresponding to the position in which the first charging part 220 is formed. In addition, the position of the second charging part 320 may be variously designated so as to correspond to various embodiments of the first charging part 220.

Hereinafter, the position of the charging part (the first charging part 220 or the second charging part 320) may be described with reference to the embodiments illustrated in FIG. 2 to FIG. 13B. It is to be noted that, although the position of the charging part may be partially limited for convenience of description, such a limitation does not limit the scope of the disclosure in connection with the charging part.

According to an embodiment, the charging part (the first charging part 220 or the second charging part 320) may be directly exposed to at least a partial surface of the housing 210 (or the body part 301).

For example, if foreign materials exist on the surface of the charging part (the first charging part 220 or the second charging part 320), information regarding the charging state of the device 200 may be distorted, or the charging performance may be degraded. According to some embodiments, electronic components existing inside the device 200 or onside the docking station 300 may be overheated in the charging process. Moreover, according to some embodiment, a low level of power loss may be difficult to detect, as described above with regard to the prior art.

Hereinafter, the above problem may be described in connection with a means and a method for removing foreign materials m on the surface of the charging part (the first charging part 220 or the second charging part 320).

Referring to FIG. 2 to FIG. 5 together, the device 200 according to various embodiments of the disclosure may include a second actuator part 230, a first opening 217, and a first duct part 240.

According to various embodiments, the second actuator part 230, which is provided separately from the first actuator part 215 for providing mechanical power to the moving part 214, may be configured such that air flows inside the housing 210. As will be described later, the second actuator part 230 may provide mechanical power necessary to suction dust according to a cleaning operation, if the device 200 is a robotic cleaner, for example.

According to various embodiments, the first opening 217 may be formed in one side of the housing 210 so as to discharge air toward the first charging part 220, in order to remove foreign materials from the first charging part 220 or from the peripheral part of the first charging part 220. The peripheral part of the first charging part 220, as used herein, may refer to the second charging part 320 of the docking station 300, or the space between the first charging part 220 and the second charging part 320.

According to various embodiments, the first opening 217 may be disposed on the peripheral part of the first charging part 220. For example, as illustrated in FIG. 2, the first opening 217 may be disposed behind the first charging part 220. However, the disposition is not necessarily limited thereto, and the first opening 217 may be disposed in front of the first charging part 220 or next thereto. Moreover, according to another embodiment, the first opening 217 may be disposed so as to surround the periphery of the first charging part 220.

According to various embodiments, the first duct part 240 may be configured to connect the second actuator part 230 and the first opening 217. The first duct part 240 is illustrated in the diagram (for example, FIG. 2, FIG. 3, FIG. 5, FIG. 11 (described later), and FIG. 12) as being formed as a conduit which has a small length and is bent simply, but the same is not necessarily limited thereto, and may be formed in more various types according to the position of the first opening 217 of the disclosure and various designs of electronic components inside the device 200.

The device 200 according to various embodiments disclosed in this document may use the second actuator part 230, the first opening 217, and the first duct part 240 so as to remove foreign materials m existing on the first charging part 220 or on the peripheral part of the first charging part 220 by discharging air thereto.

For example, if the device 200 corresponds to a robotic cleaner, the same may simultaneously perform a cleaning operation (dust-suctioning operation) through the second actuator part 230 and an operation of removing foreign materials. According to an embodiment, in a case in which the second actuator part 230 is driven to suction dust, foreign materials may be removed by directing the flow of air formed in this case to a specific position outside the housing. According to another embodiment, if the second actuator part 230 operates (inversely rotates) in the opposite direction to the above embodiment (dust-suctioning operation (forward rotation)), air may be suctioned through the first opening 217, and foreign materials may be removed according to this operation. That is, foreign materials may be removed according to the principle of suctioning foreign materials when suctioning air. It will be assumed in this document that the device 200 discharges air through the first opening 217, thereby removing foreign materials, as in the embodiment illustrated in FIG. 2.

According to various embodiments disclosed in this document, the device 200 may further include a second opening 218 in the other side of the housing 210 such that air is discharged to the outside from inside the housing 210. Furthermore, the device 200 may further include a second duct part 232 connected from the second actuator part 230 to the second opening 218. The second opening 218 and the second duct part 232 may be used to discharge air, which flows inside the housing 210 when the second actuator part 230 is driven, out of the housing 210.

FIG. 3 illustrates discharge of air through the second opening 218, unlike the embodiment in FIG. 2. The embodiment in FIG. 3 may illustrate discharge of air during a cleaning operation of the device 200 (for example, a dust-suctioning operation by a robotic cleaner), not a foreign material removing operation. According to an embodiment, the first opening 217 may be formed in a position adjacent to the first charging part 220, while the second opening 218 may be formed in a part (for example, the rear side surface 213*b*) of the housing 210 regardless of the position in which the first charging part 220 is formed.

According to various embodiments, the first duct pact 240 may be connected to the second duct part 232. As illustrated in FIG. 2 and FIG. 3, the second duct part 232 according to an embodiment may extend toward the second opening 218. In addition, the first duct part 240, which branches off from a side surface of the second duct part 232, may extend toward the first opening 217. According to an embodiment, the first duct part 240 may be configured such that air discharged to the outside through the second duct part 232 bypasses toward the first opening 217, thereby removing foreign materials. This may be advantageous in that, when air is discharged as a result of a normal operation of the device 200 (for example, a dust-suctioning operation by a robotic cleaner), air discharged toward the second opening 218 is made to bypass in a simple manner, thereby removing foreign materials without consuming a large amount of electric power.

According to various embodiments, the device 200 may further include a direction switching part 233 for selectively controlling the flow of air to the first duct part 240 and the second duct part 232.

Referring back to FIG. 2 to FIG. 5, the device 200 according to various embodiments disclosed in this document may be, for example, an automatic traveling device such as a robotic cleaner. In this case, the device 200 may further include a dust-gathering part 250 contained in the housing, a suction port for suctioning dust d, which is connected to the dust-gathering part 250, and a suction duct part 260 connecting the dust-gathering part 250 and the suction port. In addition, the device 200 may further include a cleaning brush 270 positioned on the lower surface of the housing. With reference to the drawings, the cleaning brush 270 according to an embodiment may be positioned in the suction port.

According to various embodiments, the dust-gathering part 250 may be connected with the second actuator part 230. In addition, an operation may proceed in order to suction dust into the dust-gathering part 250 through driving of the second actuator part 230.

According to various embodiments, at least one filter 231 and 251 may be further included in the path along which air flows through the second actuator 230. By providing the filter 231 and 251, dust stored in the dust-gathering part 250 may be prevented from being discharged out of the housing 210 together with air that flows as a result of driving of the second actuator 230.

According to various embodiments, in order to remove foreign materials on the charging part (for example, the first charging part 220 or the second charging part 320), a normal cleaning operation and an operation of removing foreign materials by using air discharged from the device may be performed together. According to an embodiment, the first charging part 220 may be positioned behind the suction port with reference to the direction in which the device 200 moves, and the first opening 217 may be positioned behind the first charging part 220. This makes it possible to perform a primary foreign material removing operation, during which dust is suctioned through the suction port of the device 200, and a secondary foreign material removing operation, during which air discharged from the first opening 217 is used, as a series of operations.

Figure 6:
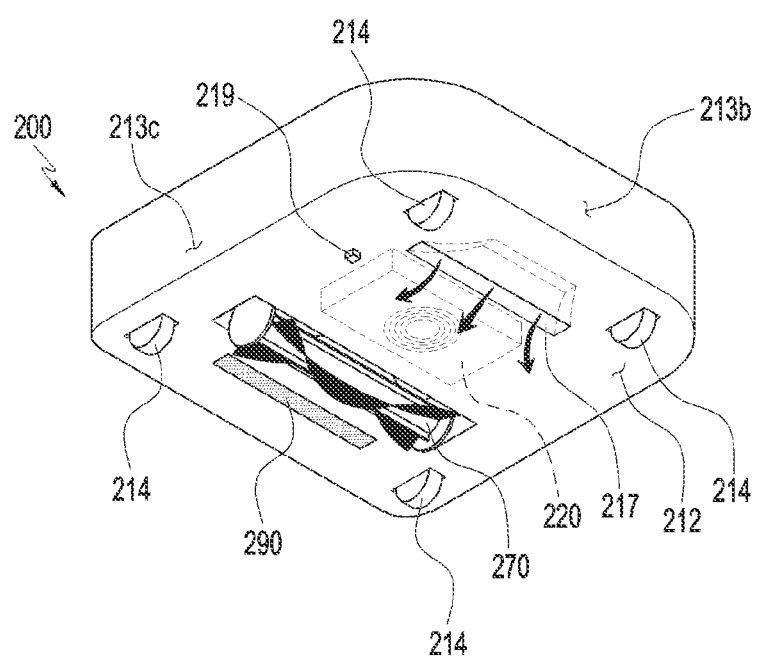
FIG. 6 is a diagram illustrating the sectional shape of a first opening of an automatic moving device according to various embodiments disclosed in this document.

FIG. 6 is a diagram illustrating the sectional shape of a first opening 217 of an automatic moving device according to various embodiments disclosed in this document.

The first opening 217 according to various embodiments may be formed in a position adjacent to the surface of a housing 210 having a first charging part 220 disposed thereon. In addition, as in the embodiment illustrated in FIG. 6, the first opening 217 may be formed so as to slope with regard to the surface 212 of the housing having the first charging part 220 disposed thereon. According to an embodiment, the first opening 217 may be disposed on a sloping surface 212*a* of the housing. The inclination of the first opening 217 may be determined in view of various factors, such as the area of the first charging part 220 and a second charging part 320 of a docking station 300, the distance between the first charging part 220 and the second charging part 320, and the like. According to another embodiment, the direction in which the first opening 217 is open may be variously designated in view of the flow of air discharged out of the housing 210 and the direction in which foreign materials are supposed to scatter.

Figure 7:
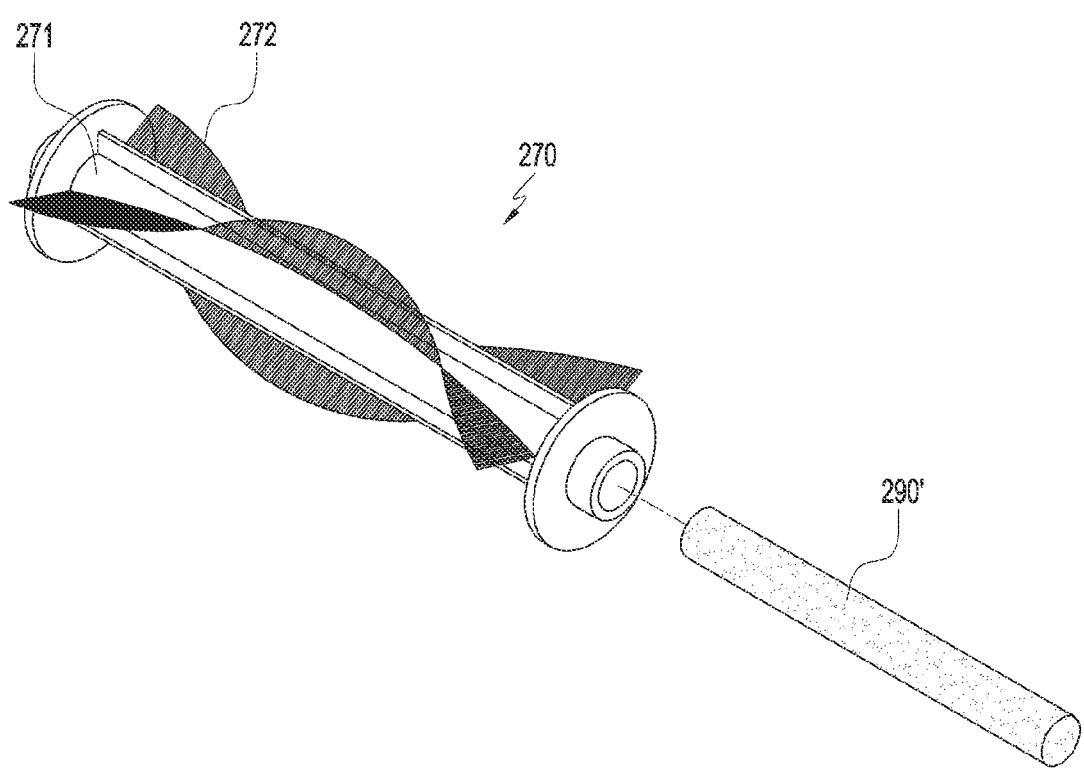
FIG. 7 is a perspective view illustrating the lower surface of an automatic moving device according to various embodiments disclosed in this document.
Figure 8:
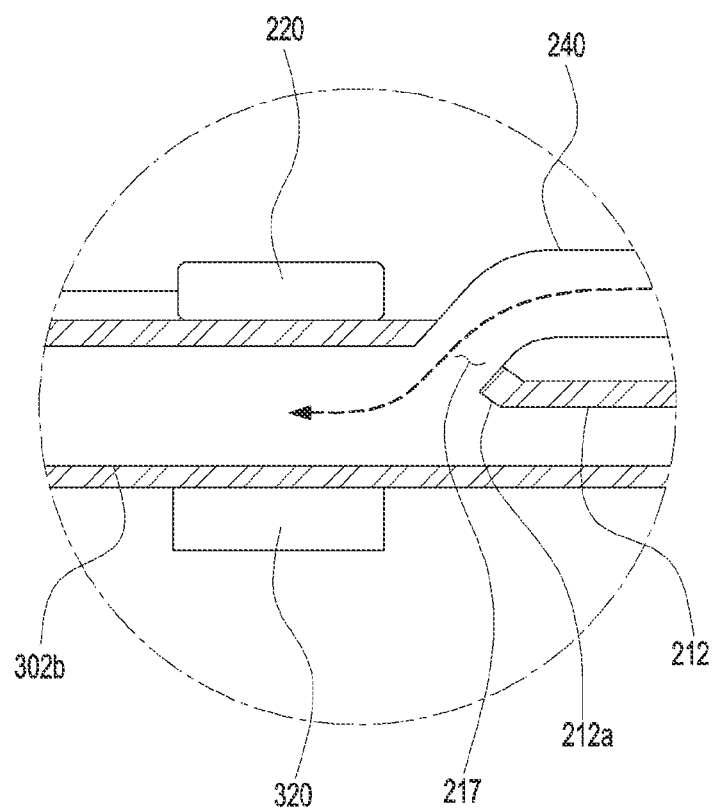
FIG. 8 is a diagram illustrating a magnetic substance, which is provided on a cleaning brush of an automatic moving device according to various embodiments disclosed in this document.

FIG. 7 is a perspective view illustrating the lower surface 212 of a device 200 according to various embodiments disclosed in this document. FIG. 8 is a diagram illustrating a magnetic substance 290', which is provided on a cleaning brush 270 of a device 200 according to various embodiments disclosed in this document.

Referring to FIG. 7, the device 200 may be provided with at least one magnetic substance 290. According to an embodiment, the magnetic substance 290 may be disposed on the lower surface 212 of the device 200 in front of or behind the position in which a brush 270 is disposed. While the brush 270 is used to remove foreign materials, the magnetic substance 290 may be used to further facilitate removal of metallic foreign materials. According to an embodiment, instead of or in addition to the magnetic substance 290 included on the lower surface 212 of the device 200, a magnetic substance 290' may be provided inside the brush 270 as illustrated in FIG. 8.

According to various embodiments, the device 200 may further include a foreign material detecting part 219 disposed in a position adjacent to the first charging part 220. The foreign material detecting part 219, as used herein, may be an IR communication module between the first charging part 220 and a second charging part 320 provided on an electronic device (for example, a docking station 300) disposed outside the automatic moving device. Data regarding electric power transmission/reception may be exchanged between the first charging part 220 and the second charging part 320, during electric power transmission/reception, by using the IR communication module. According to various embodiments disclosed in this document, by using such an existing IR communication module, foreign materials may be detected without any separate sensor for detecting foreign materials, in other words, without incurring any additional cost.

The device 200 according to various embodiments disclosed in this document may perform the charging operation and the foreign material removing operation through a processor 217. The charging operation and the foreign material removing operation may be performed synchronously or asynchronously, and may be performed in real time and actively according to the foreign material detecting operation by the foreign material detecting part 219.

Next, docking stations 300 and 500 according to various embodiments in this document will be described with reference to FIG. 4, FIG. 5, FIG. 9, and FIG. 10.

The docking stations 300 and 500 according to various embodiments disclosed in this document may include a plate-type docking station 300 and an insert-type docking station 500. According to an embodiment, the docking stations 300 and 500 may be stations for power-charging automatic moving devices 200 and 400 according to various embodiments.

Referring to FIG. 4 and FIG. 5 first, the plate-type docking station 300 may include a body part 301, a docking part 302, a second charging part 320, a third actuator part 340, a third opening 360, and a third duct part 370.

According to various embodiments, the body part 301 may be configured to contain the third actuator part 340 and/or various electronic components. Examples of electronic components contained in the body part 301 may include a processor 330 (for example, 120 in FIG. 1), a memory (for example, 130 in FIG. 1), a sound output device (for example, 155 in FIG. 1), a display device (for example, 160 in FIG. 1), an audio module (for example, 170 in FIG. 1), a sensor module (for example, 178 in FIG. 1), an interface (for example, 177 in FIG. 1), a camera module (for example, 180 in FIG. 1), a power management module (for example, 188 in FIG. 1), a battery (for example, 189 in FIG. 1), a communication module (for example, 190 in FIG. 1), and an antenna module (for example, 197 in FIG. 1). The electronic components contained in the body part 301 may be similar to electronic components contained in the device 200, and may be used while being interlinked with the electronic components contained in the device 200.

According to various embodiments, the docking part 302 may be provided on one side of the body part 301. The docking part 302 illustrated in FIG. 4 and FIG. 5 may be a plate-type docking part extending from the lower part of the body part 301. According to an embodiment, the plate-type docking part 302 illustrated in FIG. 4 and FIG. 5 may include a sloping plate 302*a* and a planar plate 302*b*. This enables the device 200 to easily enter the docking station 300. According to an embodiment, a seating groove 303 may be provided on the planar plate 302*b* of the docking part 302 such that the moving part 214 of the device 200 is seated thereon, in order to guarantee that a stable charging operation proceeds.

According to various embodiments, the second charging part 320 may be formed in a position in which the same faces the first charging part 220 provided in the device 200 when the device 200 docks with the docking station 300. According to an embodiment, as illustrated in FIG. 4 and FIG. 5, the second charging part 320 of the plate-type docking station 300 may be disposed adjacent to the upper surface of the docking part 302.

According to various embodiments, the third actuator part 340 may be provided in the docking station 300 so as to provide mechanical power necessary to collect dust. By discharging or suctioning air through the third opening 360 and the third duct part 370, the docking station 300 may remove foreign materials existing on the first charging part 220, on the second charging part 320, or in the space between the first charging art 220 and the second charging part 320. The third actuator part 340 may provide a stronger suction force than the second actuator part 230 of the device 200. According to an embodiment, when a dust collecting operation is performed by using the strong suction power from the third actuator part 340, a foreign material removing operation may be performed together. According to some embodiments, foreign materials may be scattered to peripheral parts by air discharged from the first opening 217 of the device 200. The third actuator part 340 of the docking station 300 may then be operated to suction air, thereby effectively removing foreign materials from the device 200, the docking station 300, and peripheral parts thereof.

According to various embodiments, if the device 200 is a robotic cleaner, the docking station 300 may further include a large-capacity dust-gathering part 350 for collection. Furthermore, the docking station 300 may include a third opening 360 and a third duct part 370 connecting the dust-gathering part 350 for collection and the third opening 360. According to an embodiment, the third opening 360 may be configured both to remove foreign materials and to suction dust.

When the device 200 docks with the docking station 300, the third actuator part 340 may be driven such that dust stored in the dust-gathering part 250 of the device 200 is transferred to the dust-gathering part 350 for collection. The docking station 300 may include a separate processor 330. The processor 330 may perform an operation of collecting dust by using the dust-gathering part 350 for collection, and may also perform a power charging operation between the device 200 and the docking station 300.

Figure 9:
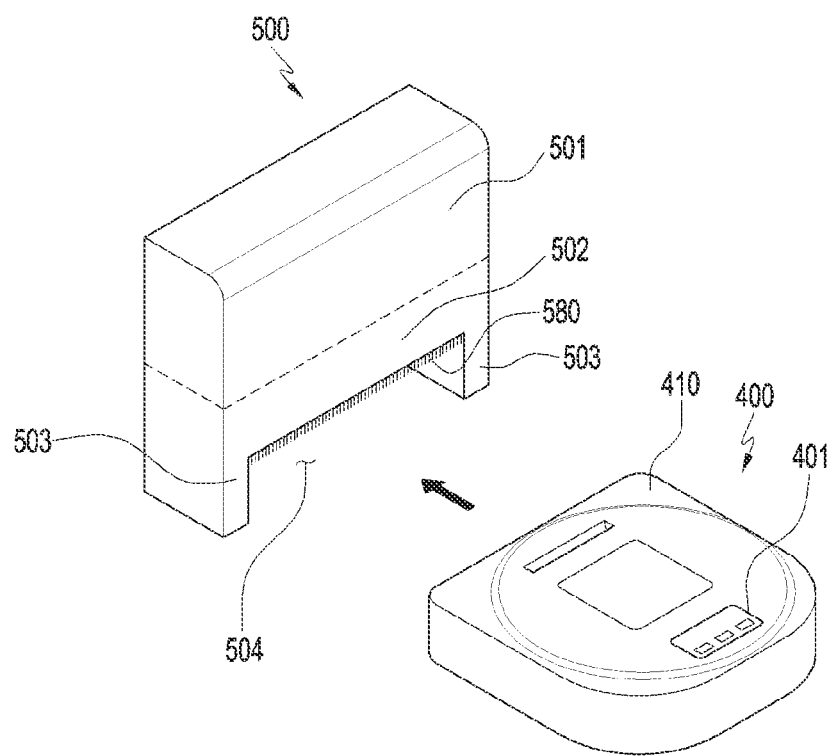
FIG. 9 is a diagram illustrating an automatic moving device docking with a docking station having a docking part lead into the body part thereof, according to various embodiments disclosed in this document.
Figure 10:
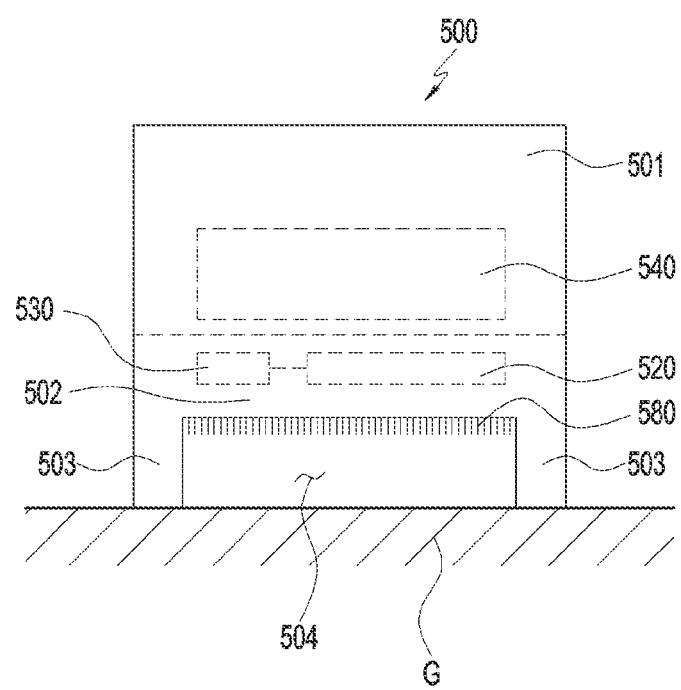
FIG. 10 is a diagram schematically illustrating the internal configuration of the docking station in FIG. 9.
Figure 11:
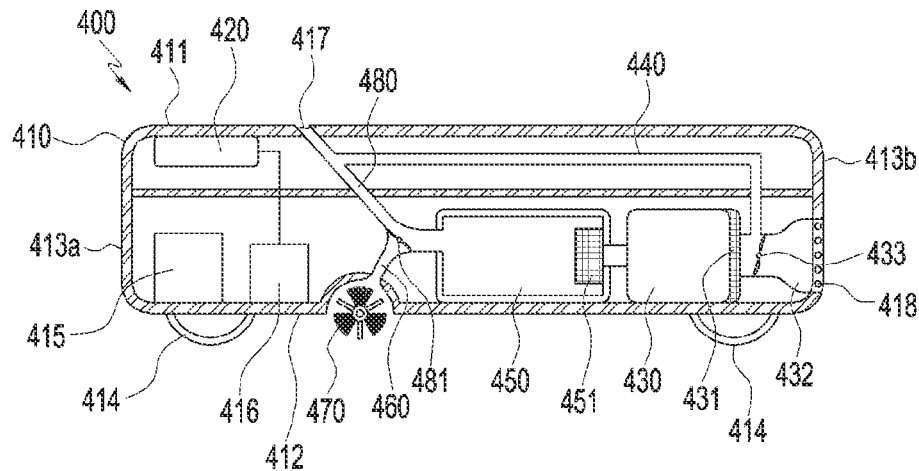
FIG. 11 is a sectional diagram illustrating an automatic moving device according to an embodiment different from that in FIG. 2.
Figure 12:
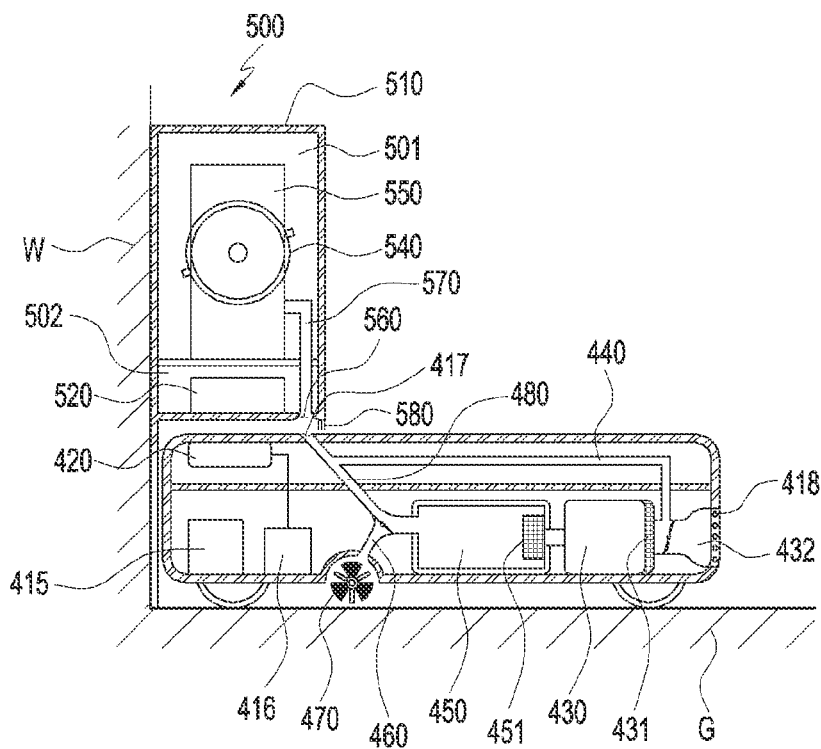
FIG. 12 is a sectional diagram illustrating the automatic moving device in FIG. 11, which has docked with the docking station in FIG. 9.

FIG. 9 is a diagram illustrating a device 400 docking with an insert-type docking station 500 according to various embodiments disclosed in this document. FIG. 10 is a diagram schematically illustrating the internal configuration of the docking station 500 in FIG. 9. FIG. 11 is a sectional diagram illustrating a device 400 according to an embodiment different from that in FIG. 2. FIG. 12 is a sectional diagram illustrating the device 400 in FIG. 11, which has docked with the docking station 500 in FIG. 9.

Referring to FIG. 9 and FIG. 10, the insert-type docking station 500 may include a body part 501, a docking part 502, a second charging part 520, a third actuator part 540, a third opening 560, and a third duct part 570.

According to various embodiments, the body part 501 may be configured to contain the third actuator part 540 and/or various electronic components. The electronic components contained in the body part 501 may be similar to the electronic components contained in the body part 501 in FIG. 4 and FIG. 5.

According to the embodiment illustrated in FIG. 9 and FIG. 10, the docking part 502 may be provided on the lower part of the body part 501. According to an embodiment, the docking part 502 may be integrally coupled to the lower part of the docking part 501.

The docking part 502 illustrated in FIG. 9 and FIG. 10 may be fabricated such that the device 400 can be contained in a space 504 formed to be lead-in from the lower part of the body part 501. According to an embodiment, the body part 501 may be positioned at a predetermined height by means of at least one support part 503. According to another embodiment, the body part 501 may be formed in a wall hanger type, and may have no separate support part 503.

According to various embodiments, the second charging part 520 may be formed in a position in which the same faces the first charging part 420 provided in the device 400 when the device 400 docks with the docking station 500. According to an embodiment, as illustrated in FIG. 10 and FIG. 12, the insert-type docking station 500 may have the second charging part 520 disposed adjacent to the lower surface of the docking part 502.

According to various embodiments, the third actuator part 540 included in the docking station 500 may provide mechanical power for collecting dust. By discharging or suctioning air through the third opening 560 and the third duct part 570, the docking station 500 may remove foreign materials existing on the first charging part 420, on the second charging part 520, or in the space between the first charging part 420 and the second charging part 520. The third actuator part 540 may provide stronger suction power than the second actuator 430 of the device 400. According to an embodiment, when a dust collecting operation is performed by using the strong suction power from the third actuator part 540, a foreign material removing operation may be performed together. According to some embodiments, foreign materials may be scattered to peripheral parts by air discharged from the first opening 417 of the device 400. In this case, the third actuator part 540 of the docking station 500 may be operated to suction air, thereby effectively removing foreign materials from the device 400, the docking station 500, and peripheral parts thereof.

According to various embodiments, when the device 500 is a robotic cleaner, the docking station 500 may further include a dust-gathering part 550 for collection. In addition, the docking station 500 may include a third opening 560 for dust collection and a third duct part 570 connecting the dust-gathering part 550 for collection and the third opening 560.

According to the embodiment illustrated in FIG. 9 to FIG. 12, the first charging part 420 may be disposed adjacent to the upper surface 411 of the device 400. The insert-type docking station 500 may have a fixed brush 580 provided on one side of the lower surface of the docking part 502, thereby performing a foreign material removing operation.

According to various embodiments, although not illustrated in the drawings, a separate magnetic substance (for example, 290 in FIG. 7) may be additionally provided in front of or behind the fixed brush 580 of the docking station 500. The magnetic substance may be used to more easily remove metallic foreign materials from the upper surface 411 of the device 400.

According to various embodiments, the first charging parts 220 and 420 of the devices 200 and 400 may be formed in various positioned so as to correspond to various embodiments of the docking stations 300 and 500. In an embodiment in which a plate-type docking part 302 is disclosed, the first charging part 220 may be formed on the lower surface 212 of the housing 210. In an embodiment in which an insert-type docking part 502 is disclosed, the first charging part 420 may be accordingly formed on the upper surface 411 of the housing 410.

Referring to FIG. 11 and FIG. 12, in order to remove foreign materials from the first charging part 420 or from the peripheral part of the first charging part 420, a first opening 417 may be formed in a position adjacent to the first charging part 420. The position and shape of the first openings 217 and 417 and the first duct parts 240 and 440 may be variously modified so as to correspond to the position of the first charging parts 220 and 420. According to an embodiment, the first opening 417 may be connected to a duct part 480 for dust collection. According to another embodiment, the first opening 417 may be combined with an opening for dust collection, as illustrated in FIG. 11 and FIG. 12. This may make it possible to perform a foreign material removing operation and a dust collecting operation by using a single first opening 417. Obviously, in another embodiment, the first opening 417 may be provided separately from the opening for dust collection.

According to an embodiment, although not illustrated in the drawings, in an embodiment in which an insert-type docking part 502 is disclosed, an opening for dust collection may be formed on the lower surface of the device 400. For example, a plate (for example, 302 in FIG. 5) may be formed below the support part 503 of the insert-type docking station 500 such that the device 400 can be seated thereon, and a duct part for dust collection (for example, 370 in FIG. 5) may be formed in the plate. As a result, an operation of power-charging the device 400 may be performed through the upper surface portion, and a dust collecting operation may be performed through the lower surface portion. That is, it may be possible to combine a part of the embodiment regarding the plate-type docking station 300 illustrated in FIG. 5 and a part of the embodiment regarding the insert-type docking station 500 illustrated in FIG. 11.

Figure 13A:
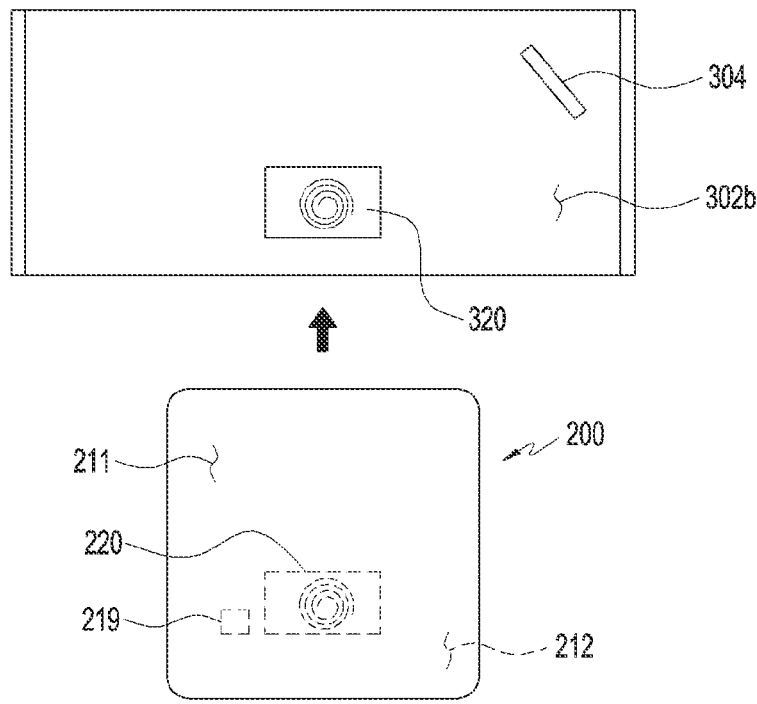
FIG. 13A and FIG. 13B are diagrams illustrating the operating principle of a foreign material detecting part when an automatic moving device docks with a docking station according to various embodiments.
Figure 13B:
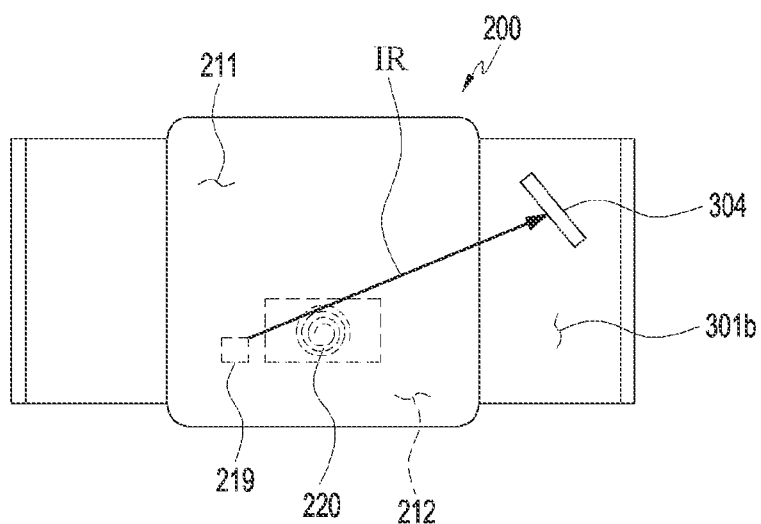

FIG. 13A and FIG. 13B are diagrams illustrating the operating principle of a foreign material detecting part 219 when an automatic moving device 200 docks with a docking station (for example, 300 in FIG. 5), according to various embodiments.

According to various embodiments, the device 200 and the docking station (for example, 300 in FIG. 5) may be provided with IR communication modules 219 and 304 for communication, respectively. The device 200 and the docking station 300 may use the IR communication modules 219 and 304 as a foreign material detecting part 219. According to an embodiment, the device 200 may have a foreign material detecting part 219 disposed on the lower surface 212 of the device 200 so as to be adjacent to the peripheral part of the first charging part 220. The docking station 300 may have a foreign material detecting part 304 disposed on a planar plate 302b of the docking part so as to be adjacent to the peripheral part of the second charging part 320.

Referring to FIG. 13B, after the device 200 has docked with the docking station (for example, 300 in FIG. 5), the foreign material detecting part 219 provided in the device 200 may emit an IR beam toward the foreign material detecting part 304 provided in the docking station 300. For example, if foreign materials exist on the first charging part 220, no the second charging part 320, or in the space between the first charging part 220 and the second charging part 320, communication may be disrupted by refraction of the IR beam, or signals may be delivered at a low intensity level. This point may be used to identify whether or not foreign materials exist.

According to various embodiments, the same method as described above may be used to identify whether or not foreign materials exist, in the case of the insert-type docking station (for example, 500 in FIG. 9) as well. According to an embodiment, an IR communication system may be implemented by providing a reflective mirror on the inner surface of at least one support part 503 of the docking station (for example, 500 in FIG. 9).

Above embodiments have been described in connection with an example wherein, according to the embodiment illustrated in FIG. 2 to FIG. 5, the second charging part 320 is formed on the upper surface of the docking part 302 (or on the planar plate 302b) of the plate-type docking station 500, and the first charging part 220 is formed on the lower surface 212 of the device 200. In addition, the embodiment illustrated in FIG. 9 to FIG. 12 has been described in connection with an example wherein the second charging part 520 is formed on the lower surface of the docking part 502 of the insert-type docking station 500, and the first charging part 420 is formed on the upper surface 411 of the device 400.

It is to be noted that the position of the first charging part 220 and that of the second charging part 320 are not necessarily limited thereto. According to another embodiment, by providing the plate-type docking part 302 illustrated in FIG. 5 below the support part 503, the second charging part may be formed on the upper surface of the docking part of the insert-type docking station, and the first charging part may be formed on the lower surface of the device.

Figure 14:
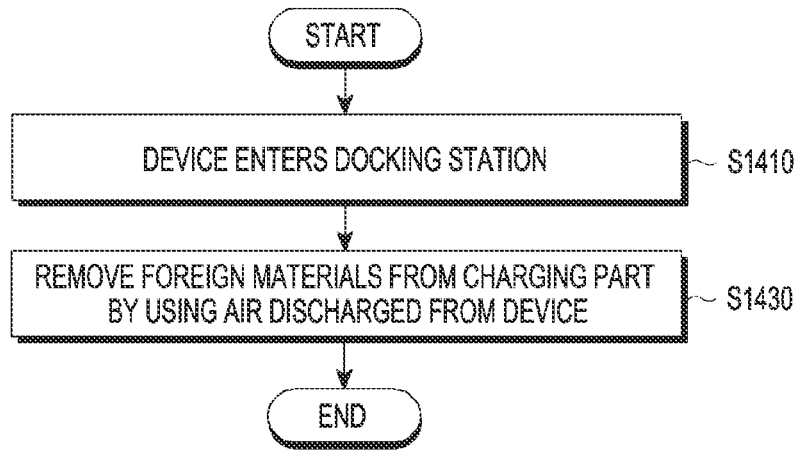
FIG. 14 is a diagram illustrating a foreign material removing method according to various embodiments disclosed in this document.

FIG. 14 is a diagram illustrating a foreign material removing method according to various embodiments disclosed in this document.

The foreign material removing method according to various embodiments disclosed in this document may be performed when an automatic moving device (for example, 200 in FIG. 2 or 400 in FIG. 11) docks with a docking station (for example, 300 in FIG. 5 or 500 in FIG. 12). The description that "when an automatic moving device docks with a docking station" may include a process in which the device 200 or 400 enters the docking station 300 or 500, and a state in which the device 200 or 400 is seated on the docking station 300 or 500. That is, the foreign material removing method may be performed before and/or after the device 200 or 400 is fully seated on the docking station 300 or 500.

According to various embodiments, the foreign material removing method may be implemented under the control of a processor (for example, 120 in FIG. 1) (at least one of 216 in FIG. 2, 330 in FIG. 5, 416 in FIG. 11, and 530 in FIG. 10). According to an embodiment, the processor 216 or 416 provided in the device 200 or 400 and the processor 330 or 530 provided in the docking station 300 or 500 may control a charging operation and a foreign material removing operation independently or while interworking with each other.

Referring to FIG. 14, the foreign material removing method according to an embodiment may include an operation (S1410) of a device (for example, 200 in FIG. 2 or 400 in FIG. 11) entering a docking station (for example, 300 in FIG. 5 or 500 in FIG. 12); and an operation (S1430) of removing foreign materials existing on the charging part (for example, 220 in FIG. 2 or 420 in FIG. 11) of the device 200 or 400, on the charging part (for example, 320 in FIG. 5 or 520 in FIG. 12) of the docking station 300 or 500, or between the charging parts (for example, 220 and 320 or 420 and 520) by using air discharged from the device 200 or 400.

In relation to operation S1410, the processor (for example, 120 in FIG. 1) (at least one of 216 in FIG. 2, 330 in FIG. 5, 416 in FIG. 11, and 530 in FIG. 10) may control the device 200 or 400 so as to enter the docking station.

In relation to operation S1430, the processor (for example, 120 in FIG. 1) (at least one of 216 in FIG. 2, 330 in FIG. 5, 416 in FIG. 11, and 530 in FIG. 10) may remove foreign materials from the charging part (for example, 220 in FIG. 2, 320 in FIG. 5, 420 in FIG. 11, or 520 in FIG. 12) or from the peripheral part of the charging part by using air discharged from the first opening (for example, 217 in FIG. 2 or 417 in FIG. 11) of the device 200 or 400.

Figure 15:
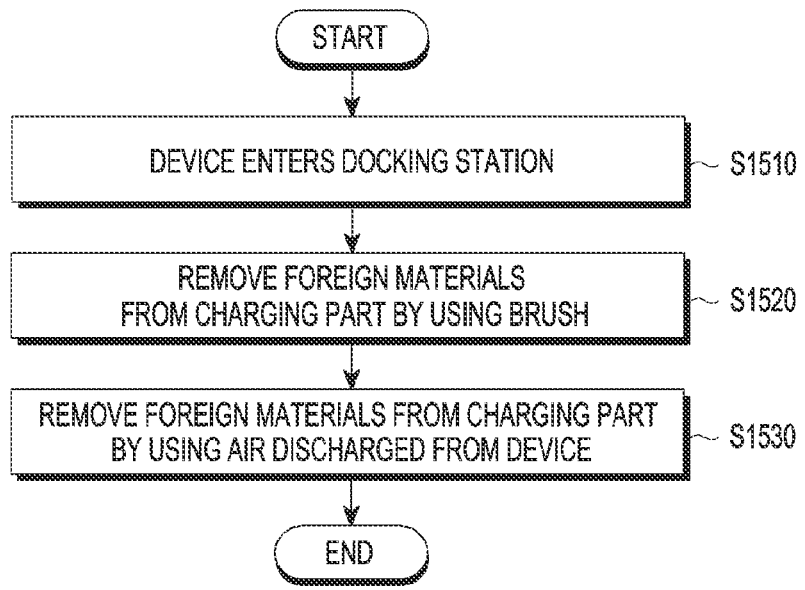
FIG. 15 is a diagram illustrating a foreign material removing method according to an embodiment different from that in FIG. 14.

FIG. 15 is a diagram illustrating a foreign material removing method according to an embodiment different from that in FIG. 14. Hereinafter, the same description as in FIG. 14 may be omitted.

Referring to FIG. 15, the foreign material removing method according to an embodiment may include an operation (S1510) of a device (for example, 200 in FIG. 2 or 400 in FIG. 11) entering a docking station (for example, 300 in FIG. 5 or 500 in FIG. 12); and an operation (S1530) of removing foreign materials by using air discharged from the device 200 or 400. In addition, the method may further include, between operations S1510 and S1530, an operation (S1520) of removing foreign materials by using a cleaning brush (for example, 270 in FIG. 2) included in the device 200 or 400 or a brush (for example, 580 in FIG. 9) included in the docking station.

Operation S1510 may be identical to operation S1410 described above, and operation S1530 may be identical to operation S1430 described above.

In relation to operation S1520, the processor (for example, 120 in FIG. 1) (at least one of 216 in FIG. 2, 330 in FIG. 5, 416 in FIG. 11, and 530 in FIG. 10) may perform an operation of primarily removing foreign materials from the peripheral part of the charging part by using the brush 270 or 580 provided in the device, and secondarily removing foreign materials through the operation (S1530) of removing foreign materials by using air.

Figure 16:
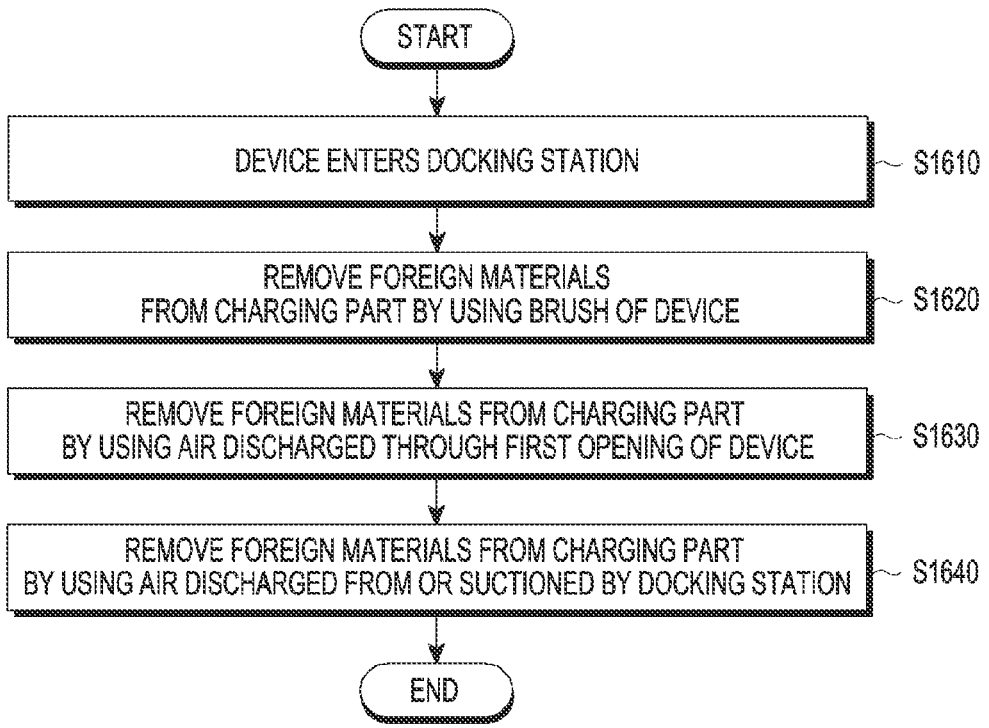
FIG. 16 and FIG. 17 are diagrams illustrating foreign material removing methods according to embodiments different from that in FIG. 14, respectively.
Figure 17:
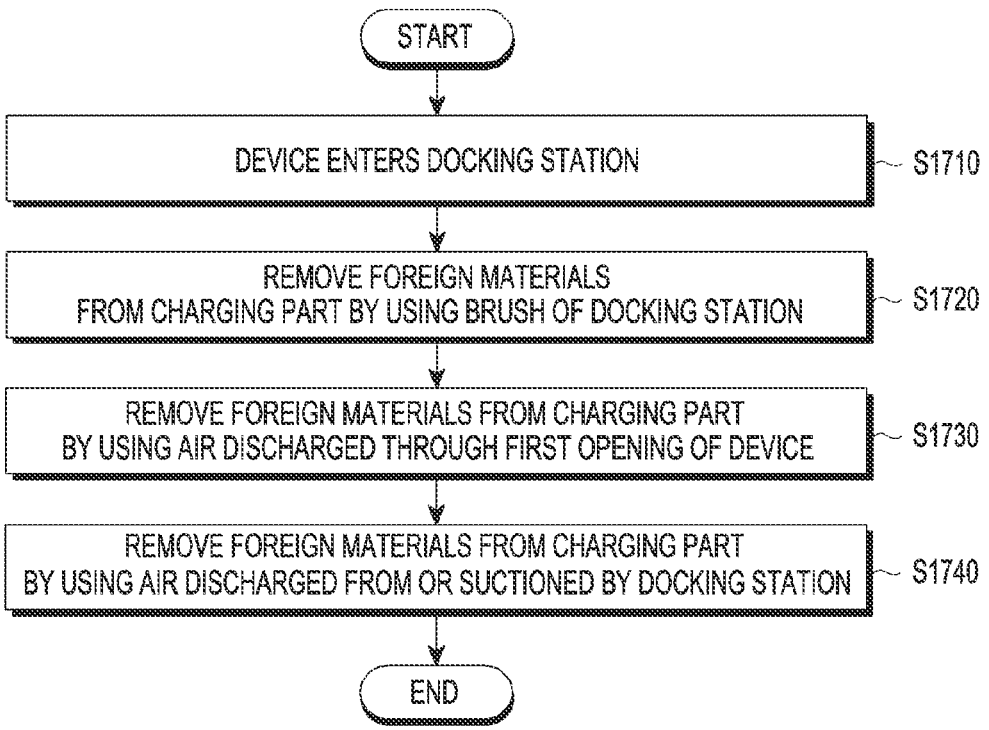

FIG. 16 and FIG. 17 are diagrams illustrating foreign material removing methods according to embodiments different from that in FIG. 14, respectively.

FIG. 16 may illustrate a foreign material removing method by using the device 200 and the plate-type docking station 300 according to the embodiments illustrated in FIG. 2 to FIG. 5. In addition, FIG. 17 may illustrate a foreign material removing method by using the device 400 and the insert-type docking station 500 according to the embodiments illustrated in FIG. 9 to FIG. 12.

Referring to FIG. 16, the foreign material removing method according to an embodiment may include an operation (S1610) of the device 200 entering the docking station 300; an operation (S1620) of removing foreign materials by using the cleaning brush (for example, 270 in FIG. 2) included in the device 200; and an operation (S1630) of removing foreign materials by using air discharged from the device 200. In addition, the method may further include an operation (S1640) of removing foreign materials by using air discharged from the docking station 300 or air suctioned thereby.

In relation to operation S1610, if electric power measured from the device 200 is equal to/lower than a designated value, the processor (for example, 120 in FIG. 1) may control the device 200 so as to enter the docking station 300.

In relation to operation S1620, the processor (for example, 120 in FIG. 1) may perform an operation of removing foreign materials from the charging part by using the cleaning brush (for example, 270 in FIG. 2). For example, if the device 200 is a robotic cleaner, the processor 120 may control the device 200 so as to enter the docking station 300 while performing a cleaning operation. In this case, the device 200 may remove foreign materials from the second charging part (for example, 320 in FIG. 5) provided in the docking station 300 by using the cleaning brush 270.

In relation to operation S1630, the processor (for example, 120 in FIG. 1) may perform an operation of removing foreign materials from the charging part by using air discharged from the device 200. For example, foreign materials may be removed from the second charging part (for example, 320 in FIG. 5) provided in the docking station 300 by using air discharged through the first opening (for example, 217 in FIG. 2) of the device 200.

In relation to operation S1640, the processor (for example, 120 in FIG. 1) may additionally remove foreign materials existing on the peripheral part of the charging part or foreign materials scattered over the peripheral part of the charging part through operations (S1620 and S1630) of removing foreign materials by driving the third actuator part (for example, 350 in FIG. 5) provided in the docking station 300. A high-output motor may be used as the third actuator part 350, and the third actuator part 350 may rotate forwards/backwards depending on the embodiment. Air can be suctioned or discharged powerfully by using the third actuator part 350, and peripheral parts of the device 200 and the docking station 300 may be neatly cleaned in this process.

Referring to FIG. 17, the foreign material removing method according to an embodiment may include an operation (S1710) of the device 400 entering the docking station 500; an operation (S1720) of removing foreign materials by using the brush (for example, 580 in FIG. 2) of the docking station 500; and an operation (S1730) of removing foreign materials by using air discharged from the device 400. In addition, the method may further include an operation (S1740) of removing foreign materials by using air discharged from the docking station 500 or air suctioned thereby.

In relation to operation S1710, if electric power measured from the device 400 is equal to/lower than a designated value, the processor (for example, 120 in FIG. 1) may control the device 400 so as to enter the docking station 500.

In relation to operation S1720, the processor (for example, 120 in FIG. 1) may perform an operation of removing foreign materials from the charging part by using the brush (for example, 580 in FIG. 9). The brush 580 may be designed to contact the upper surface 411 of the device 400, when the device 400 enters the docking station 500, thereby removing foreign materials.

In relation to operation S1730, the processor (for example, 120 in FIG. 1) may perform an operation of removing foreign materials from the charging part by using air discharged from the device 400. For example, air discharged through the first opening (for example, 417 in FIG. 11) of the device 400 may be used to remove foreign materials existing on the first charging part (for example, 420 in FIG. 11), on the second charging part (for example, 520 in FIG. 11), or between the first charging part 420 and the second charging part 520.

In relation to operation S1740, the processor (for example, 120 in FIG. 1) may remove foreign materials existing on the peripheral part of the charging part or foreign materials scattered over the peripheral part of the charging part through operations (S1720 and S1730) of removing foreign materials by driving the third actuator part (for example, 550 in FIG. 12) provided in the docking station 500. A high-output motor may be used as the third actuator part 550, and the third actuator part 550 may be driven forwards/backwards depending on the embodiment. Air can be suctioned or discharged powerfully by using the third actuator part 550, and peripheral parts of the device 400 and the docking station 500 may be neatly cleaned in this process.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in this document, there may be provided an automatic moving device (for example, 200 in FIG. 2) including: a housing (for example, 210 in FIG. 2) containing therein at least one moving part (for example, 214 in FIG. 2) and a first actuator part (for example, 215 in FIG. 2), configured to provide mechanical power to the moving part; a first charging part (for example, 220 in FIG. 2) for wireless charging of electric power used by the device, the first charging part disposed adjacent to at least a part of the surface of the housing; a second actuator part (for example, 230 in FIG. 2) for causing air to flow; a first opening (for example, 218 in FIG. 2) formed in one side of the housing so as to discharge air toward the first charging part in order to remove foreign materials from the first charting part or from a peripheral part of the first charging part; and a first duct part (for example, 240 in FIG. 2) connected from the second actuator part to the first opening.

According to various embodiments, the automatic moving device may further include: a second opening (for example, 216 in FIG. 2) formed in the other side of the housing so as to discharge air outwards from inside the housing; and a second duct part (for example, 232 in FIG. 2) connected from the second actuator part to the second opening.

According to various embodiments, the first duct part may be connected to the second duct part, and the first duct part may be configured such that air discharged outwards through the second duct part bypasses toward the first opening.

According to various embodiments, the automatic moving device may further include a direction switching part (for example, 233 in FIG. 2) for selectively controlling a flow of air to the first duct part or the second duct part.

According to various embodiments, the first opening may be formed adjacent to the surface of the housing, on which the first charging part is disposed, and is formed to be inclined with respect to the surface of the housing, on which the first charging part is disposed.

According to various embodiments, the automatic moving device may further include a processor (for example, 217 in FIG. 2) configured to control a charging operation of the first charging part and a removing operation for foreign materials from the first charging part or from the peripheral part of the first charging part.

According to various embodiments, the automatic moving device may further include a magnetic substance (for example, 290 in FIG. 6) disposed in at least a partial area of the lower surface of the housing.

According to various embodiments, the automatic moving device may further include a foreign material detecting part (for example, FIG. 219) disposed in a position adjacent to the first charging part. The foreign material detecting part may be an IR communication module between the first charging part and a second charging part provided in an electronic device disposed outside the automatic moving device.

According to various embodiments, the first charging part may be a wireless charging coil or a connecting terminal for charging with an electronic device disposed outside the automatic moving device.

According to various embodiments, the automatic moving device may further include a dust-gathering part (for example, 250 in FIG. 2) contained in the housing, a suction port for dust suction connected to the dust-gathering part, and a suction duct part (for example, 260 in FIG. 2) connecting the dust-gathering part and the suction port.

According to various embodiments, the first charging part may be positioned behind the suction port with reference to a direction in which the automatic moving device moves, and the first opening may be positioned behind the first charging part.

According to various embodiments, the dust-gathering part may be connected with the second actuator part, and the second actuator part may be used to suction dust into the dust-gathering part.

According to various embodiments, the automatic moving device may further include at least one filter (for example, 231 or 251 in FIG. 2) on a path along which air flows through the second actuator.

According to various embodiments, the automatic moving device may further include a cleaning brush (for example, 270 in FIG. 2) positioned on the lower surface of the housing.

According to various embodiments, the automatic moving device may further include a magnetic substance (for example, 290' in FIG. 8) inside the cleaning brush.

According to various embodiments disclosed in this document, there may be provided a docking station (for example, 300 in FIG. 5) including: a body part (for example, 301 in FIG. 5); a docking part (for example, 302 in FIG. 5) provided on one side of the body part such that the automatic moving device docks therewith; a second charging part (for example, 320 in FIG. 5) formed in a position facing a first charging part (for example, 220 in FIG. 2) provided in the automatic moving device when the automatic moving device is docked; a third actuator part (for example, 350 in FIG. 5) contained in the body part; a third opening (for example, 360 in FIG. 5) for removing the foreign materials; and a fourth duct part (for example, 370 in FIG. 5) connected from the third actuator part to the third opening, wherein air is discharged or suctioned through the third opening so as to remove foreign materials existing on the first charging part, on the second charging part, or between the first charging part and the second charging part.

According to various embodiments, the docking part may be a plate-type docking part (for example, 301 in FIG. 5) extending from the lower portion of the body part or a docking part (for example, 301 in FIG. 9) configured to be lead-in from the lower portion of the body part.

A method for removing foreign materials according to various embodiments disclosed in this document may be performed by using a device 200 and a docking station 300. The method may include an operation (for example, S1410 in FIG. 14) in which the automatic moving device enters the docking station; and an operation (for example, S1430 in FIG. 14) of removing foreign materials existing between a charging part of the automatic moving device or a charging part of the docking station by using air discharged from the automatic moving device.

According to various embodiments, the method may further include an operation (for example, S1520 in FIG. 15) of removing foreign materials by using a cleaning brush included in the automatic moving device or a brush included in the docking station, before performing the operation of removing foreign materials by using air discharged from the automatic moving device.

According to various embodiments, the method may further include an operation of removing foreign materials existing between the charging part of the automatic moving device or the charging part of the docking station by using air discharged from the docking station or air suctioned thereby, after performing the operation of removing foreign materials by using air discharged from the automatic moving device.

Although specific embodiments have been described above in the detailed description of the disclosure, it will be apparent to those skilled in the art that various modifications and changes may be made thereto without departing from the scope of the disclosure.

What is claimed is:

1. A system comprising: an automatic moving device comprising: a housing containing therein at least one moving part and a first actuator configured to provide mechanical power to the moving part; a wireless power receiver configured to receive wireless power from a wireless power transmitter for charging a battery of the automatic moving device, the wireless power receiver disposed adjacent to an inner surface of the housing; a second actuator configured to cause air to flow; a first opening formed in one side of the housing so as to discharge air away from or along part of an outer surface of the housing in order to remove foreign materials from the part of the outer surface of the housing or from a periphery of the wireless power receiver; a second opening formed in the housing and configured to discharge air caused to flow by the second actuator to outside the housing; a first duct extending from the second actuator to the first opening; a second duct extending from the second actuator to the second opening; a direction switch for selectively controlling a flow of air to the first duct or the second duct; and an air flow controller configured to selectively control airflow to the first and second openings; and a dock comprising the wireless power transmitter configured to transmit wireless power to the wireless power receiver when the automatic moving device is docked in the dock.

2. The system of claim 1, wherein the first duct extends to the second duct, and the first duct is configured such that air discharged outwards through the second duct part bypasses toward the first opening.

3. The system of claim 1, wherein the first opening is inclined with respect to the part of the outer surface of the housing to which the wireless power receiver is adjacent.

4. The system of claim 1, further comprising a processor configured to control a charging operation using the wireless power receiver and an operation for reducing presence of foreign material.

5. The system of claim 1, further comprising a magnetic substance disposed in at least a partial area of a lower surface of the housing.

6. The system of claim 1, further comprising a foreign material detector disposed adjacent to the wireless power receiver.

7. The system of claim 1, further comprising a dust collector contained in the housing, a suction port for dust suction connected to the dust collector, and a suction duct connecting the dust collector and the suction port.

8. The system of claim 7, wherein the wireless power receiver is positioned behind the suction port relative to a forward moving direction of the automatic moving device, and the first opening is positioned behind the wireless power receiver.

9. The system of claim 7, wherein the dust collector is connected with the second actuator, and the second actuator is used to suction dust into the dust collector.

10. The system of claim 7, further comprising at least one filter on an air flow path through the second actuator.

11. The system of claim 1, wherein the automatic moving device further comprises: a processor configured to control the direction switch of air flow through the second opening when the automatic moving device is docked to perform a removing operation.

12. The system of claim 11, wherein the processor is further configured to control charging of the automatic moving device using the wireless power transmitter and the wireless power receiver.

* * * * *